(12) United States Patent
Yuasa et al.

(10) Patent No.: US 7,364,124 B2
(45) Date of Patent: Apr. 29, 2008

(54) ELEVATOR DEVICE FOR TELEVISION CAMERA

(75) Inventors: Fumio Yuasa, Hino (JP); Hisanao Aoki, Hino (JP)

(73) Assignee: Furukawa Co., Ltd., Tokyo (JP)

( * ) Notice: Subject to any disclaimer, the term of this patent is extended or adjusted under 35 U.S.C. 154(b) by 777 days.

(21) Appl. No.: 10/660,257

(22) Filed: Sep. 11, 2003

(65) Prior Publication Data

US 2004/0075736 A1    Apr. 22, 2004

(30) Foreign Application Priority Data

Oct. 17, 2002   (JP)   .............................. 2002-302550
May 2, 2003     (JP)   .............................. 2003-127072

(51) Int. Cl.
    *A45F 5/00*    (2006.01)
(52) U.S. Cl. .................. 248/125.8; 248/161; 248/407; 353/243; 396/428
(58) Field of Classification Search ............ 248/125.8, 248/161, 404, 157, 187.1; 348/376, 61; 353/243; 396/419, 428
    See application file for complete search history.

(56) References Cited

U.S. PATENT DOCUMENTS

| 4,337,845 | A | | 7/1982 | Zelli et al. ..................... 187/17 |
| 5,114,109 | A | * | 5/1992 | Fitz et al. ..................... 248/404 |
| 5,708,535 | A | * | 1/1998 | Orimo et al. ............... 359/823 |
| 7,059,592 | B2 | * | 6/2006 | Huh et al. ................ 267/64.12 |
| 7,065,812 | B2 | * | 6/2006 | Newkirk et al. ................ 5/600 |
| 7,134,634 | B2 | * | 11/2006 | Jeon et al. ................... 248/161 |

FOREIGN PATENT DOCUMENTS

| GB | 2249536 A | 5/1992 |
| JP | 51-153974 U | 12/1976 |
| JP | 01-266397 A | 10/1989 |
| JP | 03-056383 A | 3/1991 |
| JP | 08-338429 | 12/1996 |
| JP | 62-188636 | 8/1997 |
| JP | 200045288 | 2/2000 |
| JP | 2000 199920 A | 7/2000 |

OTHER PUBLICATIONS

United Kingdom Search Report dated Oct. 30, 2003.
English Translation of Office Action from Japanese Patent Office dated Jan. 17, 2006.

* cited by examiner

Primary Examiner—Ramon O Ramirez
(74) Attorney, Agent, or Firm—Young Basile

(57) ABSTRACT

An elevator device for a television camera which reduces noise to a low level, which moves up or down a television camera at high speed regardless of whether the moving distance is short or long, and which makes it possible that camera position movement at high speed is compatible with smooth speed change in low speed range in film shooting.

The elevator device for a television camera comprises a stationary cylinder 1, a movable cylinder 3 on which a television camera 2 is mounted, and a linear motor 4 for moving the movable cylinder 3 up or down along the stationary cylinder 1, wherein the movable cylinder 3 is in the form of a telescopic tube and includes a pulley 32 and a wire rope 33 for extension and contraction of the movable cylinder 3 when the movable part 24 of linear motor 4 is moved up or down.

8 Claims, 13 Drawing Sheets

ELEVATOR DEVICE FOR TELEVISION CAMERA

FIELD OF THE INVENTION

This invention relates to an elevator device for a television camera for moving up and down the camera during film shooting in a recording studio of a television station or the like.

PRIOR ART

Among conventional elevator devices for the television camera, there is a type configured such that in a stationary cylinder 51, there is provided a movable cylinder 53 driven by a motorized cylinder 54 to go up or down to thereby move up or down a television camera 52 mounted at the top end of the movable cylinder 53 as shown in FIGS. 12 to 14.

In this elevator device, the movable cylinder 53 is a telescopic tube including an upper and a lower tube, a motorized cylinder 54 is disposed between a stationary cylinder 51 and a support 59 fixed to the lower tube 66 by connection plates 58, pulleys 62 are mounted at the top of the support 59, wire ropes 63 are passed around the pulleys 62 and attached at one end to the bottom end portions of the stationary cylinder 51 and at the other end to bottom end portions of the upper tube 67.

Guides 60 to guide the lower tube 66 of the movable cylinder 53 are provided at the upper end of the stationary cylinder 51 and guides 61 to guide upper tube 67 are provided at the upper end of the lower tube 66.

The motorized cylinder 54 includes a ball screw 55, a motor to rotate the shaft of the ball screw 55, and a speed reducer 57, and the movable cylinder 53 extends and contracts when the screw shaft of the ball screw 55 is rotated to make the nut side move.

When the motorized cylinder 54 expands, the support 59 and the pulleys 62 move up, and as shown in FIG. 14, the lower tube 66 of the movable cylinder 53 extends upward from the stationary cylinder 51 and the upper tube 67 extends from the lower tube 66, thus lifting the television camera 52.

When the motorized cylinder 54 contracts, the support 59 and the pulleys 62 move downwards, resulting in the lower tube 66 being stored in the stationary cylinder 51 and the upper tube 67 being stored in the lower tube 66, thus lowering the television camera 52.

As means for detecting the extension and contraction motions, a wire-winding type encoder 69 is provided between the stationary cylinder 51 and the movable cylinder 53 (Refer to patent document JP-A-7-25890).

Because the motorized cylinder 54 is used in the elevator device for the television camera, where the nut side of the ball screw 55 is made to move by rotating the screw shaft, the nut constantly contacts and scrapes against the cylinder tube, thus generating a scraping noise. This operating sound increases in proportion to the moving velocity. In addition, another scraping noise is generated from the speed reducer.

The film shooting sites, such as studios of television stations need to be kept silent and the noise from the filming equipment adversely affects film shooting.

During film shooting, it is desirable to raise and lower the television camera 52 as quickly as possible for a wide range from a low position to a high position.

However, the screw shaft of the ball screw 55 has an inherent permissible rotating speed, and as the moving distance becomes long, the permissible rotating speed decreases, thus decreasing the elevating speed. If the elevating speed is increased, a possible moving distance becomes shorter.

Normally, a film is shot using three or more television cameras in a studio. If a film is shot from a new angle with the camera 52 out of those cameras, in preparation for this, it is indispensable to make a quick change of camera position by camera elevation at high speed. Meanwhile, when the height of the camera is to be changed while taking a picture of an object, it is necessary to move the camera with a smooth change of speed in a low-speed range.

However, in the motorized cylinder 54 that uses the ball screw 55, the motor 56 to rotate the screw shaft of the ball screw 55, and the speed reducer 57, the maximum elevating speed is regulated by a constant lead of the ball screw 55, a constant speed reducing ratio of the speed reducer 57, and the maximum rotating speed of the motor 56. Where emphasis is placed on control in the low-speed range during film shooting, if a low lead and a high speed reducing ratio are adopted, the maximum elevating speed has to be decreased.

SUMMARY OF THE INVENTION

The present invention has been made to solve the above problem with the elevator device for the television camera, and has as its object to provide an elevator device for a television camera, which reduces noise level and which is capable of camera elevation at high speed regardless of whether the moving distance is long or short, and which makes the high-speed change of vertical camera position compatible with the smooth speed change in the low-speed range.

The elevator device for the television camera according to the present invention comprises a stationary cylinder, a movable cylinder provided with a television camera, and a linear motor for lifting and lowering the movable cylinder through the stationary cylinder.

The elevator device for the television camera uses a linear motor to move the movable cylinder up and down and obviates the need for the speed reducer and the ball screw which are sources of noise, and now that noise generated is far smaller than that of elevator devices with a motorized cylinder, this elevator device can keep quiet at the film shooting sites, such as studios in television stations.

There being no speed limits imposed according to a moving distance, the linear motor is capable of high-speed elevation regardless of whether the moving distance is long or short, and also makes the high-speed change of vertical camera position compatible with the smooth speed change in low-speed range during making a film.

By providing pulleys and wire ropes to move up and down a movable cylinder in accordance with the movement of a movable part of the linear motor, the moving distance and the elevating speed of the television camera can be made larger than the moving distance and the moving speed of the movable part of the linear motor. In this case, a less expensive linear motor can be used which has a shorter stroke than the required moving distance of the television camera.

Or, by using a movable cylinder formed by a telescopic tube made of a plurality of tubes and also providing pulleys and wire ropes to move up and down the movable cylinder in accordance with the movement of the movable part of the linear motor, the moving distance and the elevating speed of the television camera can be made larger than the moving distance and the moving speed of the movable part of the linear motor.

By providing the stationary cylinder with a constant tension spring mechanism and a pulley for balance, which are used as a balancer, by passing a wire rope through the pulley for balance, with one end of the wire rope attached to a lower position of the movable cylinder and the other end to the constant tension spring mechanism, and by mounting an electromagnetic brake for fastening and releasing a rotating shaft to the constant tension spring mechanism, the movable mass of the linear motor can be decreased and the space occupied by the elevator device. Moreover, it becomes easy to hold the movable cylinder in the stop position.

A control unit is provided which is configured such that after passage of a predetermined time following stoppage of the movable cylinder, the rotating shaft of the constant tension spring mechanism is stopped by an electromagnetic brake, and after additional passage of a predetermined time following the fastening of the rotating shaft, the holding of the movable cylinder by the linear motor is terminated, and when a Raise signal or a Lower signal is received under the condition that the holding of the movable cylinder by the linear motor has been stopped, the holding of the movable cylinder by the linear motor is resumed, and after passage of a predetermined time following resumption of the holding of the movable cylinder, the fastening of the rotating shaft of the constant tension spring mechanism by the electromagnetic brake is released to permit the movable cylinder to move up or down. This obviates the need to hold the movable cylinder by the linear motor for a long time, thus preventing the linear motor from generating heat.

By mounting a guide rail on either of the stationary cylinder and the movable cylinder, and a bracket of a concave section on the other of the cylinders, fitting a shock absorber of a concave section into the concave portion of the bracket, and mounting a guide in a manner to slidably engage with the guide rail which has been fitted into the concave portion of the shock absorber, noise can be prevented from being transmitted and amplified, so that the noise level is further reduced.

By mounting a guide rail on either of the outer tube and the inner tube of the movable cylinder, and a bracket of a concave section on the other of the tubes, fitting a shock absorber of a concave cross section into the concave portion of the bracket, and mounting a guide in a manner to slidably engage with the guide rail which has been fitted into the concave portion of the shock absorber, noise can be prevented from being transmitted and amplified, so that the noise level is further reduced.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
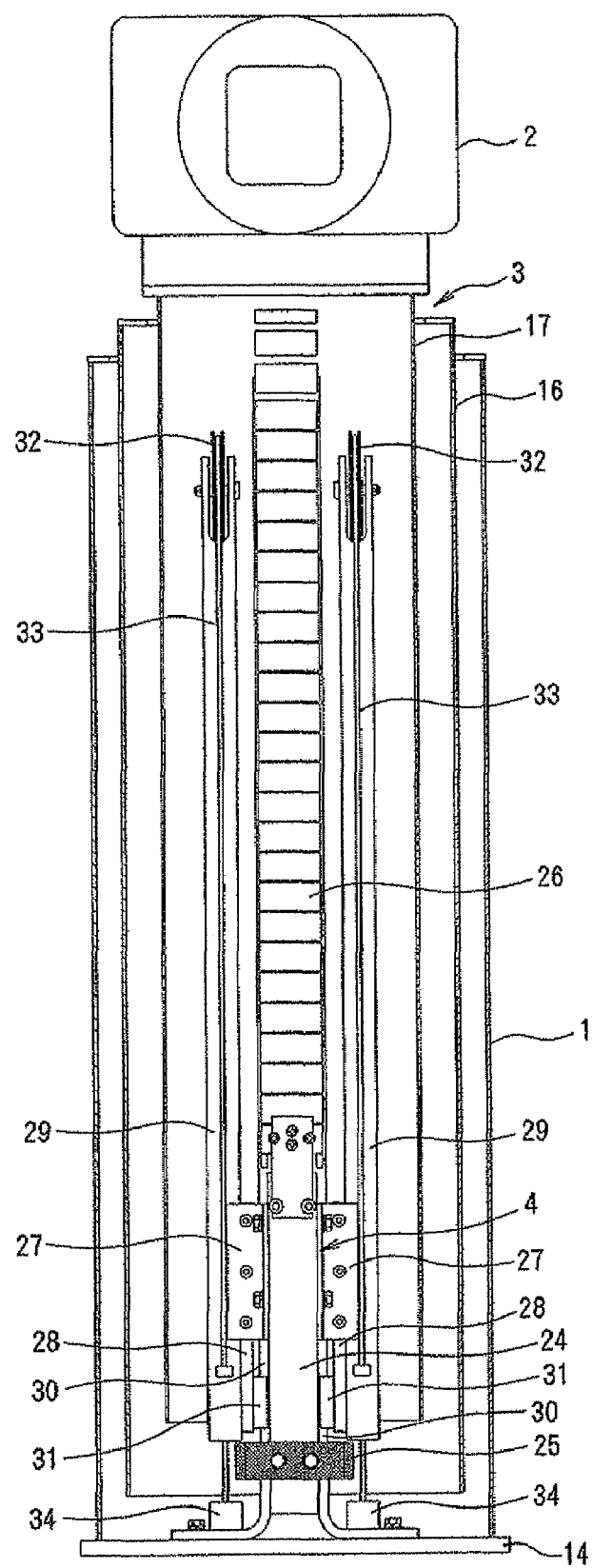
FIG. 1 is a front view partly in cross section showing the structure of an elevator device for a television camera according to an embodiment of the present invention.
Figure 2:
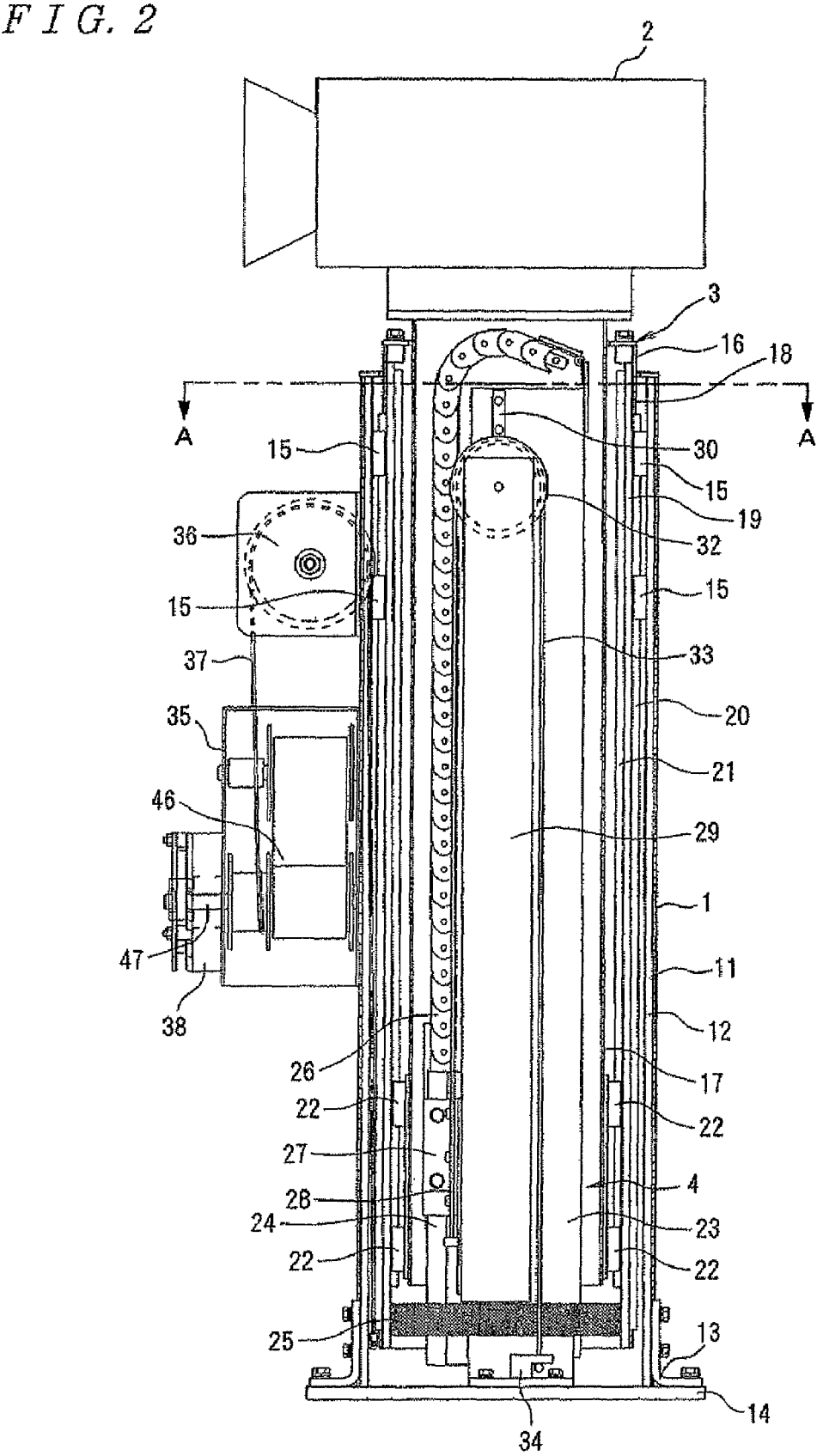
FIG. 2 is a side view partly in cross section showing the structure of an elevator device for a television camera.
Figure 3:
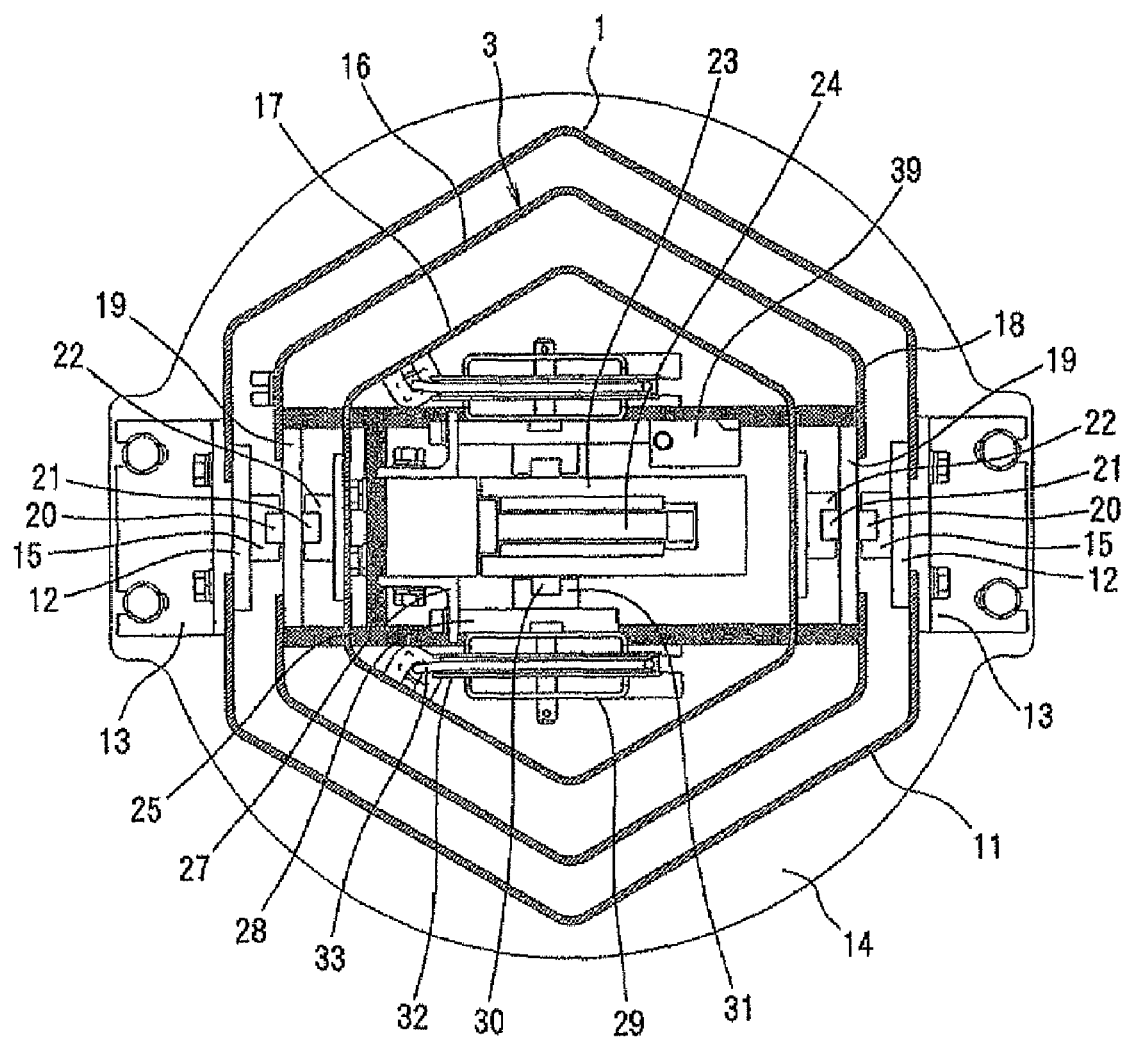
FIG. 3 is a sectional view on an enlarged scale taken along the line A-A in FIG. 2.
Figure 4:
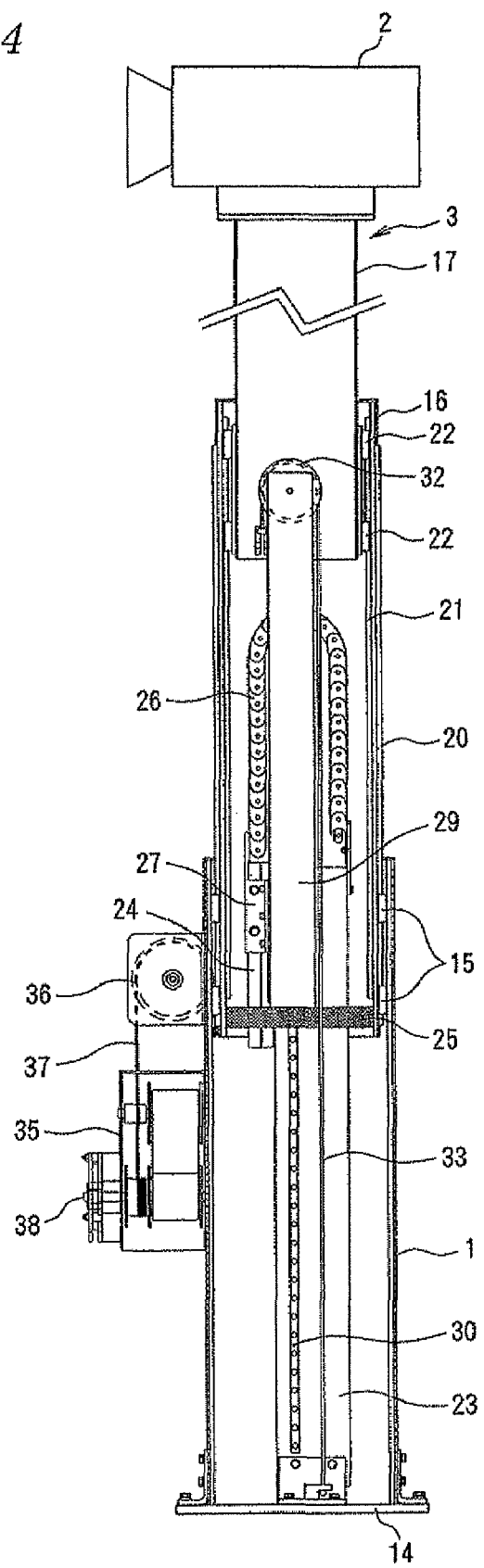
FIG. 4 is an explanatory diagram of the operation of the elevator device for a television camera.

FIG. 1 is a front view partly in cross section showing the structure of an elevator device for a television camera according to an embodiment of the present invention. FIG. 2 is a side view partly in cross section showing the structure of an elevator device for a television camera. FIG. 3 is a sectional view on an enlarged scale taken along the line A-A, with the balancer left out. FIG. 4 is an explanatory diagram of the operation of the elevator device.

This elevator device for a television camera includes a stationary cylinder 1, a movable cylinder 3 on which a television camera 2 is mounted, and a linear motor for lifting and lowering the movable cylinder 3.

The stationary cylinder 1 is configured by joining two half-members 11 with couplers 12 in a hexagonal form, and is fixed onto a bottom plate 14 using fixing brackets 13. Guides 15 of concave section are mounted on the inside of the couplers 12.

The movable cylinder 3 is a telescopic tube consisting of a lower tube 16 and an upper tube 17. The lower tube 16 is configured by joining using couplers 19 two half-members 18 of a hexagon cylinder with a smaller diameter than the diameter of the stationary cylinder 1, and is accommodated in the stationary cylinder 1. The upper tube 17 is a smaller-diameter hexagon cylinder than the lower tube 16, and is accommodated in the lower tube 16.

Two guide rails 20 guided by two guides 15 of the stationary cylinder 1 are mounted vertically on the outside of the couplers 19 of the lower tube 16. Two guide rails 21 to guide the upper tube 17 are also mounted vertically on the inside of the couplers 19. Two guides 22 of concave section guided by the guide rails 21 are mounted on the outside of the upper tube 17.

Regarding a linear motor 4, a stationary part 23 is a permanent magnet and a movable part 24 is a coil, and the stationary part 23 is installed upright on the bottom plate 14 and the movable part 24 is fixed to the lower tube 16 of the movable cylinder 3 by a movable part bracket 25. A power supply line to the movable part 24 is guided and protected by a cable bearer 26.

A support base 28 is fixed to the movable part 24 by a support bracket 27, and supports 29 are fixed to the support bases 28. Guide rails 30 are mounted vertically on the side faces of the stationary part 23, and guides 31 of concave section guided by the guide rails 30 are attached to the support base 28.

Two pulleys 32 are provided at the upper end portions of the supports 29, and wire ropes 33 are passed around the pulleys 32 and attached at one end to wire rope terminal fixtures 34 of the bottom plate 14, and at the other end to the lower end of the upper tube 17.

Further, a balancer 35 is attached to the stationary cylinder 1. The balancer 35 includes a constant tension spring mechanism 46 and a pulley 36 for balance, and a wire rope 37 is passed around the pulley 36 for balance, and attached at one end to the bottom of the lower tube 16 and at the other end to the constant tension spring mechanism 46. The constant tension spring mechanism 46 applies a constant tension to the wire rope 37 for balance to assist the linear motor 4 in giving a thrust.

Using a constant tension spring mechanism 46 for the balancer 35 provides two advantages: one is that the movable mass of the linear motor 4 can be decreased, and another is that because the constant tension spring mechanism 46 itself does not move, the space occupied by the device can be made smaller.

The constant tension spring mechanism 46 includes an electromagnetic brake that stops or releases the rotating shaft 47. To stop and hold the movable cylinder 3, which moves up and down, at a fixed position, it is only necessary to stop the rotating shaft 47 of the constant tension spring mechanism 46 by the electromagnetic brake, which is far easier than to put brake on the movable cylinder 3 itself or the wire rope 37 for balance or the balancer 35.

An encoder 39 is mounted to the support base 28. This encoder 39 is a non-contact detector to detect a moving distance of the movable cylinder 3 with reference to a linear scale (not shown) attached to the stationary part 23 of the linear motor 4.

When the power supply for drive force to the linear motor 4 is turned on and the movable part 24 is moved upwards, also up goes the lower tube 16 of the movable cylinder 3 connected through the movable part bracket 25 to the movable part 24. Simultaneously, the support base 28 connected through the support bracket 27 to the movable part 24 moves upwards together with the supports 29 and the pulleys 32. Therefore, as shown in FIG. 4, the lower tube 16 of the movable cylinder 3 extends upwards coming out of the stationary cylinder 1, and the upper tube 17 extends upwards coming out of the lower tube 16, so that the television camera 2 mounted on the top of the upper tube 17 rises at a speed twice as high as the moving speed of the movable part 24.

When the movable part 24 is moved downwards, the lower tube 16 also goes down, and simultaneously the supports 29 and the pulleys 32 go down, causing the lower tube 16 to be accommodated into the stationary cylinder 1, and also causing the upper tube 17 to be accommodated into the lower tube 16, as a result of which the television camera 2 goes down.

While the television camera moves up or down, the support base 28 is guided vertically by the guide rails 30 and the guides 31, the lower tube 16 is guided vertically by the guide rails 20 and the guides 15, and the upper tube 17 is guided vertically by the guide rails 21 and the guides 22, with the result that the movement of the television camera 2 is regulated so that it can move only in the elevating direction, thus preventing the occurrence of lateral deflection.

When the television camera 2 is to be held at a certain height, in response to a signal, the movable part 24 is stopped electrically at a predetermined position by means of an electromagnetic force of the linear motor 4, the electromagnetic brake 38 of the constant tension spring mechanism 46 in the balancer 35 is actuated to stop the rotating shaft 47, the length of the wire rope 37 for balance in the balancer 35 is mechanically held at a certain length, and the power supply for drive force of the linear motor 4 is turned off to prevent heat generation of the coil.

When camera elevation is resumed under this condition, after the power supply to drive the linear motor 4 is turned on and the electromagnetic brake 38 is released, a command of camera elevation is issued to the linear motor 4 to move the movable part 24.

Under the condition that the electromagnetic brake 38 has been released, the movable part 24 makes an elevation move in accordance with a move command to the linear motor 4 and stops at a specified position. After the linear motor 4 comes to a standstill, the height of elevation by an exciting force of the linear motor 4 is held for a predetermined time, so that the force in a series of balance transmission parts is made uniform, in other words, the restoring force of the constant tension spring mechanism 46 is balanced with the tension of the wire rope 37. When the force in the balance transmission parts becomes uniform, the electromagnetic brake 38 is actuated to stop the rotating shaft 47 of the constant tension spring mechanism 46, by which the movable cylinder 3 is held in a balanced state by the balancer 35.

In this manner, by actuating the electromagnetic brake 38 and releasing the excitation of the linear motor 4, the linear motor 4 is prevented from generating heat.

When the linear motor 4 is to be actuated under the condition that the electromagnetic brake 38 has been put into operation and the linear motor 4 has been stopped, the linear motor 4 is excited in the first place, and by the exciting force, the movable part 24 is held at the halt position, and then the electromagnetic brake 38 is released. At this time, the restoring force of the constant tension spring mechanism 46 acts, but because the force of the series of balance transmission parts has been adjusted to be uniform, the television camera 2 does not deflect which will otherwise occur as a result of the releasing of the electromagnetic brake 38.

A control unit (not shown) may be used to perform a procedure such that at the end of a predetermined time after the movable cylinder 3 has been stopped, the rotating shaft 47 of the constant tension mechanism 46 is stopped by the electromagnetic brake 38, and then after the elapse of a predetermined time, the holding of the movable cylinder 3 by the linear motor 4 is released, and after the holding of the movable cylinder 3 by the linear motor 4 has been released, when a signal to move up or down is received, the holding of the movable cylinder 3 by the linear motor 4 is resumed, and after the resumption of the holding of the movable cylinder 3, when a predetermined time elapses, the fastening of the rotating shaft 47 of the constant tension spring mechanism 46 by the electromagnetic brake 38 is released, making it possible to lift or lower the movable cylinder 3.

According to the above-mentioned arrangement, while the movable cylinder 3 is at a standstill, the linear motor 4 need not hold the movable cylinder 3 consistently, and therefore the control unit automatically releases the excitation of the linear motor 4, so that the coil can be automatically prevented from generating heat.

In this elevator device for a television camera, the linear motor 4 for moving up or down the movable cylinder 3 does not require the speed reducer and the ball screw which generate noise, as a result the level of noise is low and the film shooting sites, such as studios of television stations can be kept quiet.

The linear motor 4 has no speed limits according to the moving distance. Therefore, this elevator device for the television camera can have the high-speed change of vertical camera position compatible with the smooth speed change in the low-speed range regardless of whether the moving distance is long or short.

In virtual studios which are spreading lately, the movements of the television camera are recorded, and the images on the television camera are combined in real time with CG background images interlocked with the movements of the television camera. For this reason, the television camera is required to make correct position movements. In this elevator device for the television camera, the linear motor 4, being a direct drive machine, has no intervening parts, so that errors in target amounts of movement are small, the camera position is detected directly, and according to position data, the linear motor 4 is driven with extremely high position-reproducibility.

The movable cylinder 3, being formed as a telescopic tube for multistage extension, can provide the television camera 2 with an extremely low camera position to thereby secure a wide field of view for the cameraman, and can move up or down the television camera 2 at a speed twice as high as the speed of the movable part 24 of the linear motor 4.

In addition, provided with a balancer 35 to supply an upward tensile force to the movable cylinder 3 at all times, the movable cylinder 3 can lift the television camera 2 by a linear motor 4 with a small thrust.

In this elevator device for the television camera according to the present invention, the movable cylinder 3 is not necessarily limited to a configuration as a telescopic tube.

Figure 5:
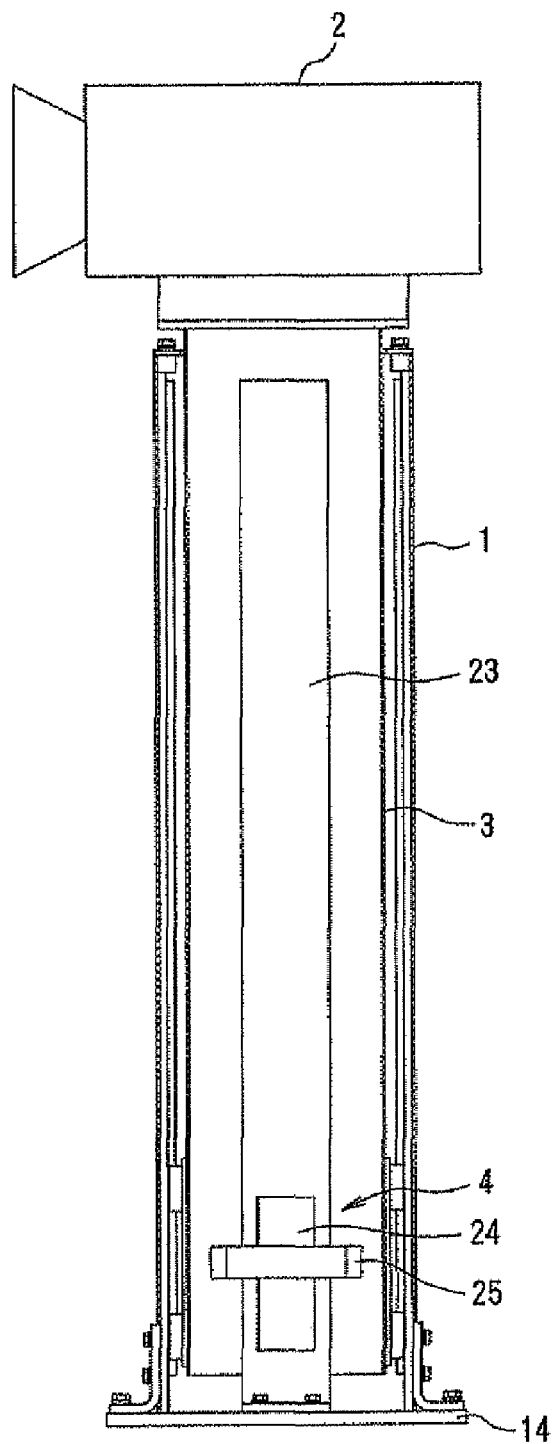
FIG. 5 is a schematic construction diagram of the elevator device for a television camera, in which the movable cylinder is formed by a single tube.

For example, as shown in FIG. 5, the movable cylinder 3 may be an unextendable single tube. The stationary part 23 of the linear motor 4 is installed upright on the bottom plate 14, and the movable part 24 is fixed to the movable cylinder 3 with the movable part bracket 25.

Figure 6:
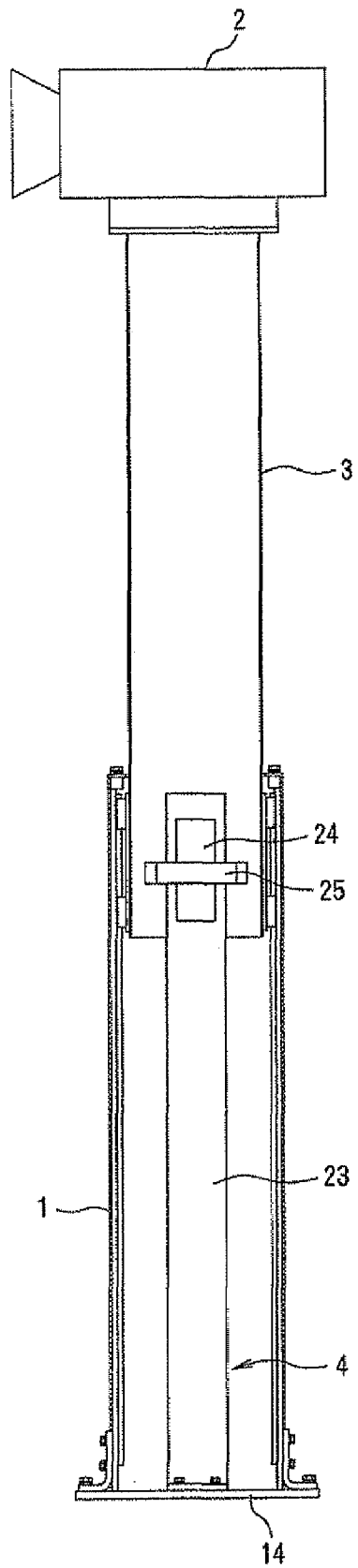
FIG. 6 is an explanatory diagram of the operation of the elevator device for a television camera.

In this case, the moving distance of the television camera 2 is equal to the moving distance of the movable part 24 of the linear motor 4 as shown in FIG. 6.

Figure 7:
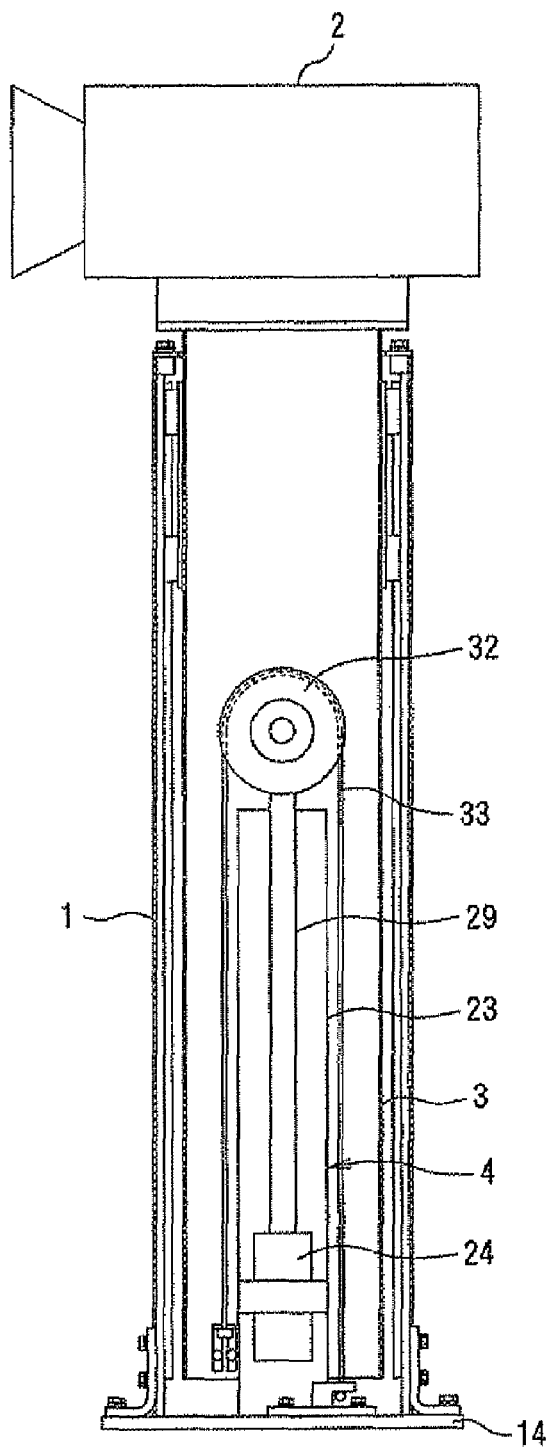
FIG. 7 is a schematic construction diagram of the elevator device for a television camera, which uses pulleys and wire ropes for camera elevation and in which the movable cylinder is formed by a single tube.

As shown in FIG. 7, the movable cylinder 3 may be formed as a single tube, the pulleys 32 may be mounted at the upper end of the supports 29 connected to the movable part 24 of the linear motor 4, the wire ropes 33 passed around the pulleys 32 are attached at one end to the bottom plate 14 and at the other end to the lower end of the movable cylinder 3.

Figure 8:
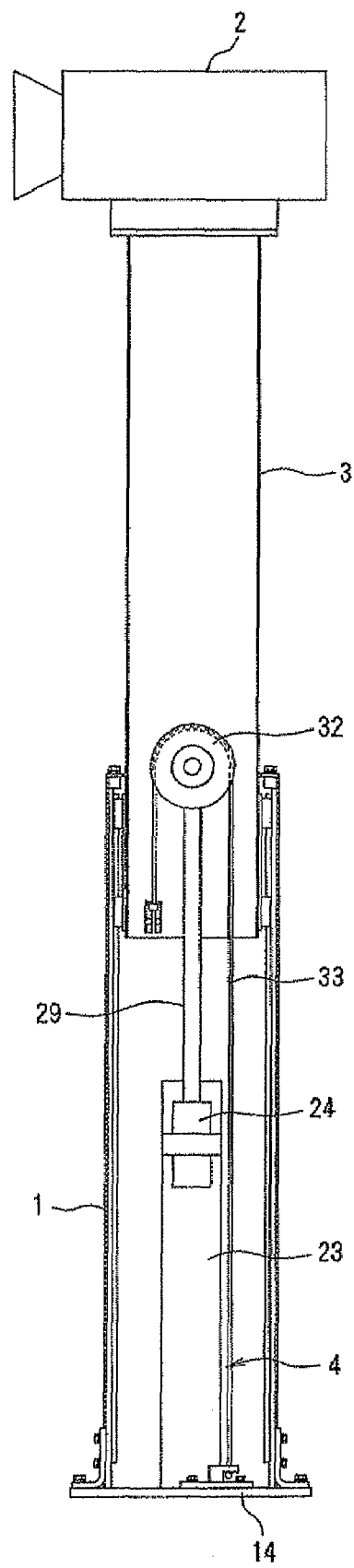
FIG. 8 is an explanatory diagram of the operation of the elevator device for a television camera.

In this case, the moving distance of the television camera 2 is twice as long as the movable part 24 of the linear motor 4 as shown in FIG. 8.

Figure 9:
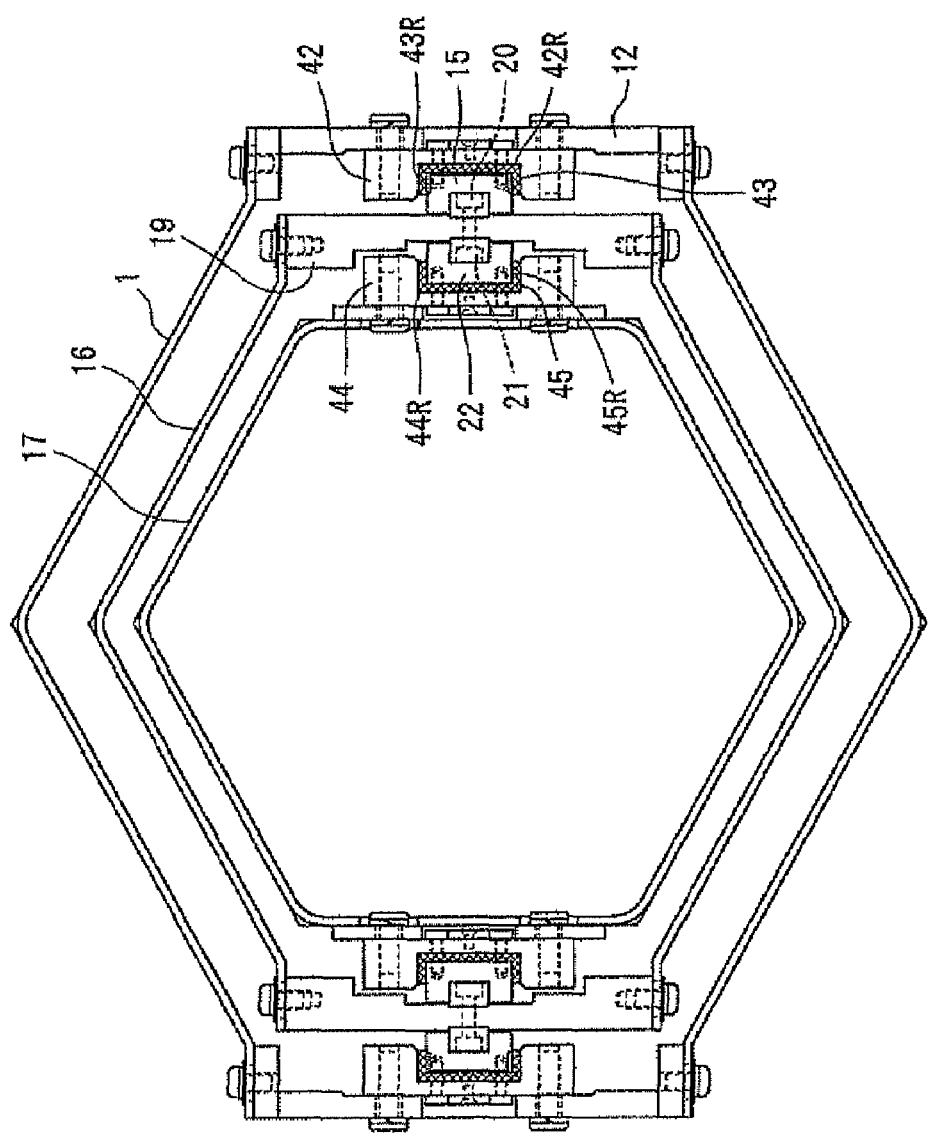
FIG. 9 is a horizontal sectional view showing the structure of the guide parts of the stationary cylinder and the movable cylinder of the elevator device for a television camera according to another embodiment of the present invention.

FIG. 9 is a horizontal sectional view showing the structure of the guide parts of the stationary cylinder and the movable cylinder of the elevator device for a television camera according to another embodiment of the present invention.

In the elevator device for the television camera, the guides 15 and the guide rails 20, and the guides 22 and the guide rails 21 need to mesh, leaving no space between them so that the stationary cylinder 1 and the lower tube 16 do not wobble against each other and the lower tube 16 and the upper tube 17 do not wobble against each other. For this reason, the guide 15 and the guide rail 20, and the guide rail 21 and the guide 22 are made to mesh under preloading.

Figure 10:
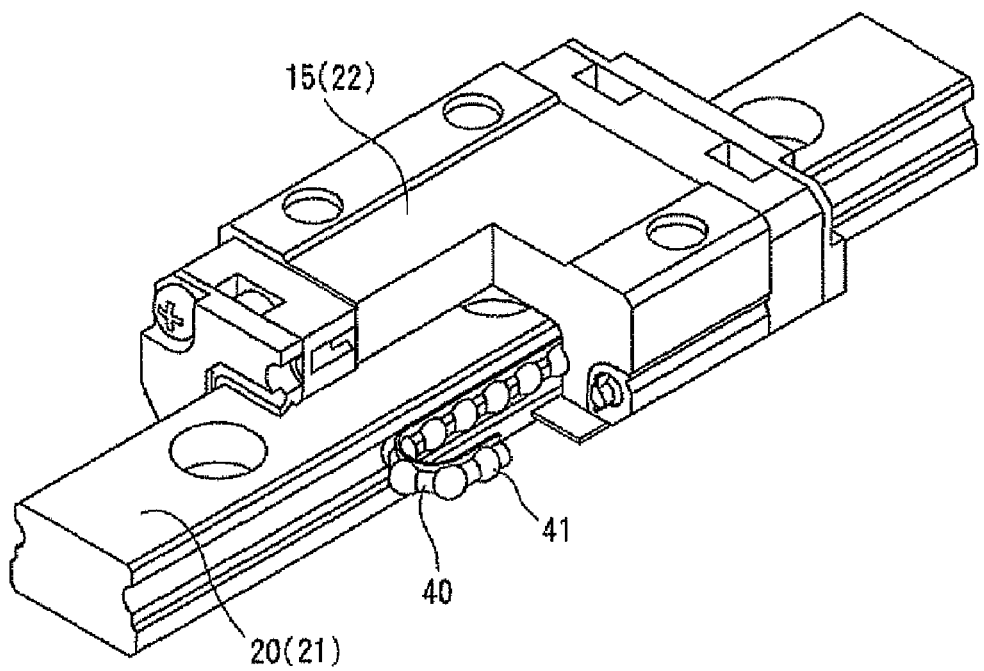
FIG. 10 is a perspective view of the guide and the guide rail showing the condition that ball retainers and balls are mounted.
Figure 11:
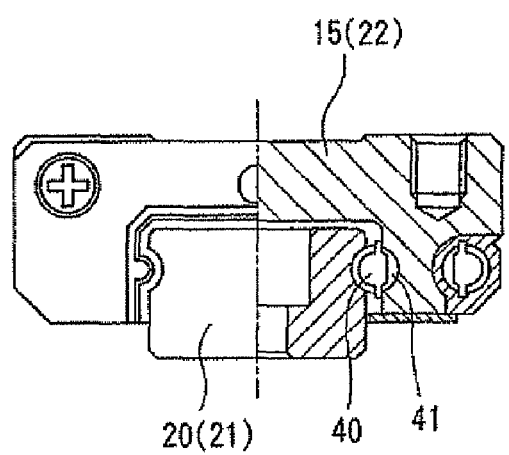
FIG. 11 is a sectional view showing the guide and the guide rail showing the condition that the ball retainers and the balls are mounted.
Figure 12:
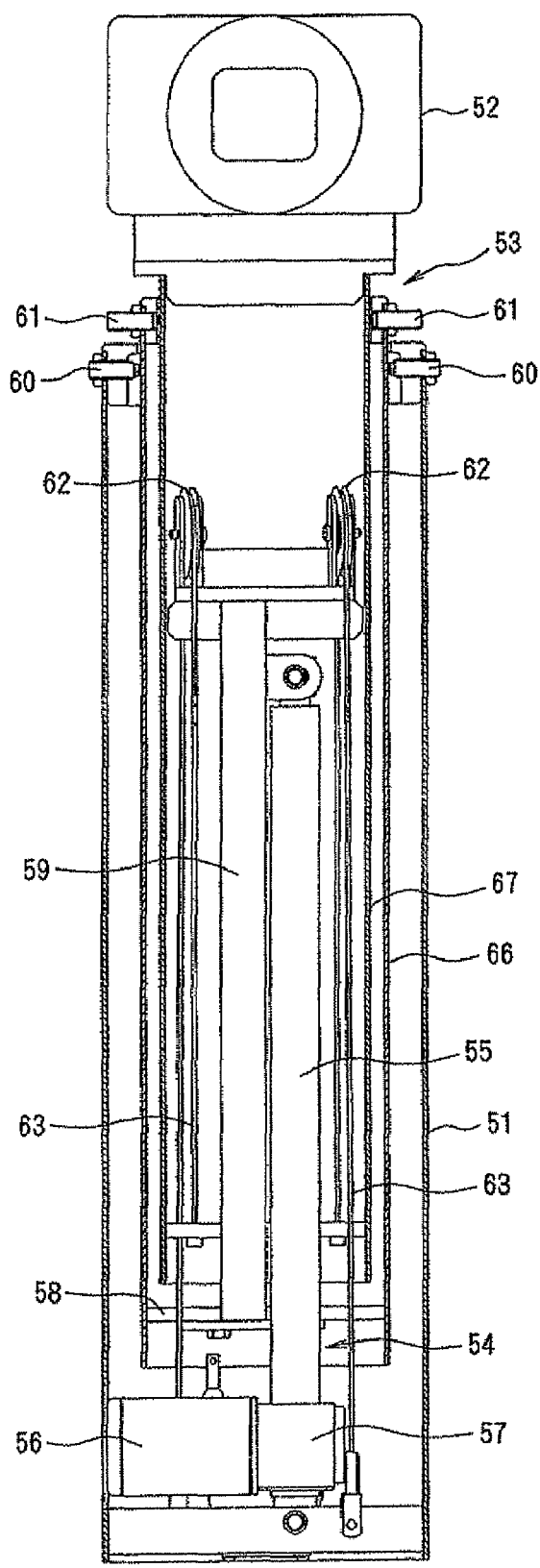
FIG. 12 is a front view partly in cross section showing the structure of a conventional elevator device for a television camera.
Figure 13:
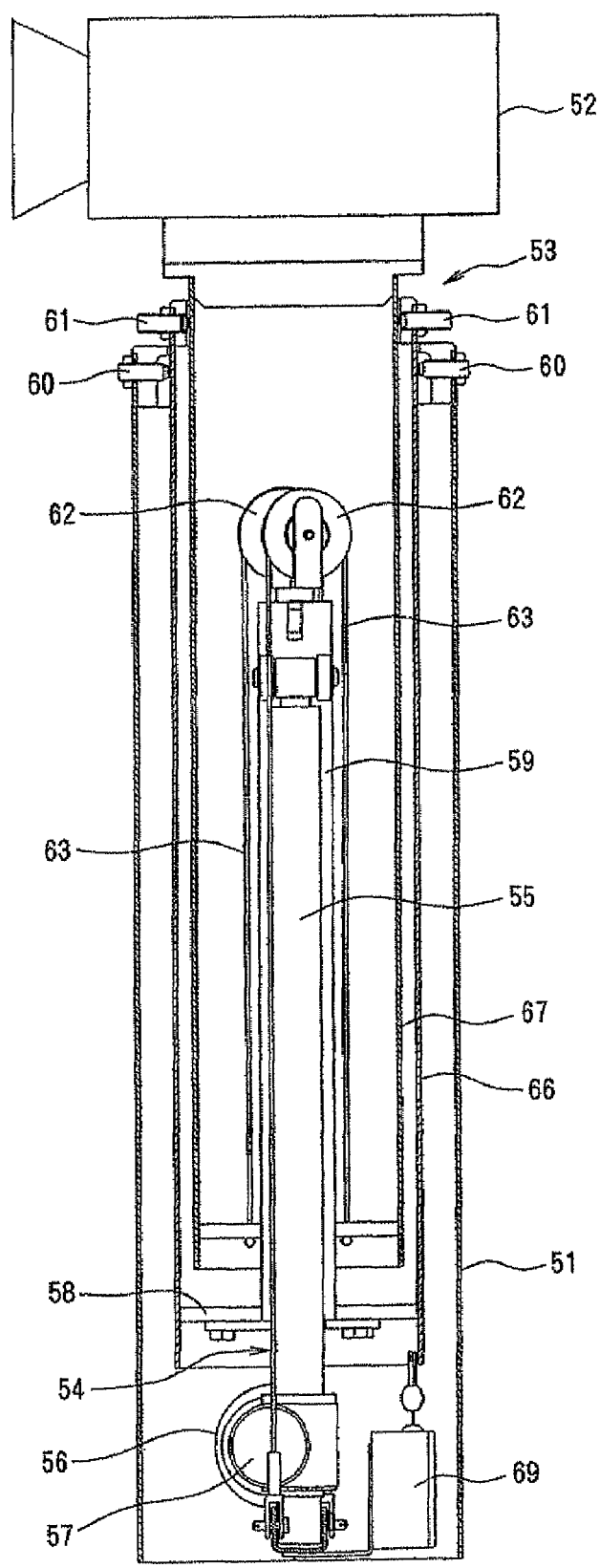
FIG. 13 is a side view partly in cross section showing the structure of a conventional elevator device for a television camera.
Figure 14:
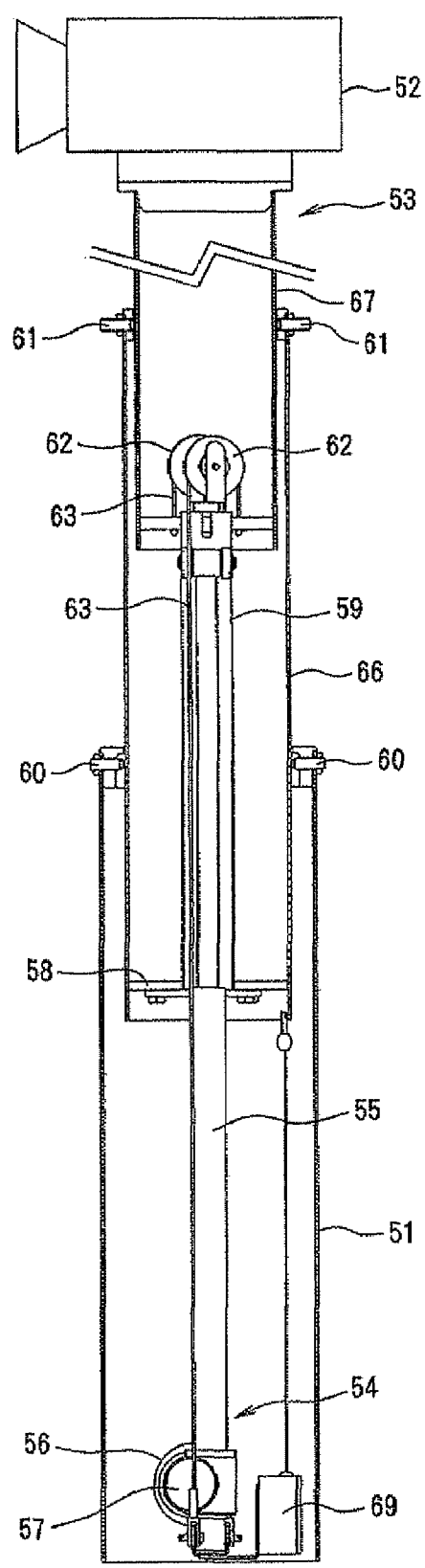
FIG. 14 is an explanatory diagram of the operation of a conventional elevator device for a television camera.

For this preloaded mesh, as shown in FIGS. 10 and 11, ball retainers 40 and balls 41 are normally disposed to intervene between the guide 15 and the guide rail 20 and between the guide rail 21 and the guide 22. However, because the guide 15 and the guide rail 20 and the guide rail 21 and the guide 22 are made to mesh perfectly, the rolling sound of the balls 41 is transmitted through the guide rails 20 and 21, couplers 19, and the guides 15 and 22 to the stationary cylinder 1, the lower tube 16, and the upper tube 17, and while the rolling sound reverberates between the thin plates between the stationary cylinder 1 and the movable cylinder 3, a large amplified noise is produced.

In this elevator device for the television camera, a bracket 42 of concave section is disposed on the inside of the coupler 12 of the stationary cylinder 1, a shock absorber 43 is put into the concave portion 42R of the bracket 42, and a guide 15 of concave section is put into the concave portion 43R of the shock absorber 43.

Further, a bracket 44 of concave section is disposed on the outside of the upper tube 17, a shock absorber 45 of concave section is put into the concave portion 43R of the bracket 43, and a guide 22 of concave section is put into the concave portion 45R of the shock absorber 45.

An elastic material, such as rubber, is used for the shock absorbers 43, 45.

As described above, because the guides 15 and 22 are provided in the brackets 42 and 44 of concave section through the intermediary of the shock absorbers 43 and 45, the guides 15 and 22 are securely prevented from being displaced and noise is prevented from being transmitted and amplified to thereby reduce noise level.

As has been described, the elevator device for the television camera according to the present invention suppresses noise level and can move up or down the television camera at high speed regardless of whether the moving distance is long or short, and can also have the camera position movement at high speed compatible with the smooth change of speed in the low speed range in film shooting.

What is claimed is:

1. An elevator device for a television camera comprising:
  a stationary cylinder;
  a movable cylinder for mounting said television camera thereon; and
  a linear motor for moving up or down said movable cylinder along said stationary cylinder, wherein said stationary cylinder includes a constant tension spring mechanism and a pulley for balance used as a balancer, wherein a wire rope for balance is passed around said pulley for balance and is attached at one end to a lower position of said movable cylinder and at the other end to said constant tension spring mechanism, and wherein said constant tension spring mechanism includes an electromagnetic brake for fastening and releasing a rotating shaft.

2. An elevator device for a television camera according to claim 1, wherein
  the pulley and the wire rope moves up or down said movable cylinder attending on the movement of a movable part of said linear motor.

3. An elevator device for a television camera according to claim 2, wherein said movable cylinder is an extendable telescopic tube consisting of a plurality of tubes and includes the pulley and the wire rope for extending and contracting said movable cylinder attending on movement of said movable part of said linear motor.

4. An elevator device for a television camera according to claim 1, wherein said movable cylinder is an extendable telescopic tube consisting of a plurality of tubes and includes the pulley and the wire rope for extending and contracting said movable cylinder attending on movement of a movable part of said linear motor.

5. An elevator device for a television camera according to claim 4, wherein a guide rail is mounted on either of an outer side tube and an inner side tube of said movable cylinder, and a bracket of a concave section other of said tubes, a shock absorber of a concave section is fitted into the concave portion of said bracket, and a guide is mounted in a manner to slidably engage with said guide rail which has been fitted into the concave portion of said shock absorber.

6. An elevator device for a television camera according to claim 1, further comprising a control unit configured such that after passage of a predetermined time following stoppage of said movable cylinder, said rotating shaft of said constant tension spring mechanism is stopped by the electromagnetic brake, and after additional passage of a predetermined time following the fastening of said rotating shaft, the holding of said movable cylinder by the linear motor is terminated, and when a Raise signal or a Lower signal is received under the condition that the holding of said movable cylinder by said linear motor has been stopped, the holding of said movable cylinder by said linear motor is resumed, and after passage of a predetermined time following resumption of the holding of the movable cylinder, the fastening of said rotating shaft of said constant tension spring mechanism by said electromagnetic brake is released to permit said movable cylinder to move up or down.

7. An elevator device for a television camera according to claim 6, wherein a guide rail is mounted on either of said stationary cylinder and said movable cylinder, and a bracket of a concave section is mounted on the other of the cylinders, a shock absorber of a concave section is fitted into the concave portion of the bracket, and a guide is mounted in a manner to slidably engage with said guide rail which has been fitted into the concave portion of said shock absorber.

8. An elevator device for a television camera according to claim 1, wherein a guide rail is mounted on either of said stationary cylinder and said movable cylinder, and a bracket of a concave sections is mounted on the other of the cylinders, a shock absorber of a concave section is fitted into the concave portion of the bracket, and a guide is mounted in a manner to slidably engage with said guide rail which has been fitted into the concave portion of said shock absorber.

* * * * *

UNITED STATES PATENT AND TRADEMARK OFFICE
CERTIFICATE OF CORRECTION

| | |
|---|---|
| PATENT NO. | : 7,364,124 B2 |
| APPLICATION NO. | : 10/660257 |
| DATED | : April 29, 2008 |
| INVENTOR(S) | : Fumio Yuasa |

It is certified that error appears in the above-identified patent and that said Letters Patent is hereby corrected as shown below:

Column 1, Line 53; Delete "where" and insert -- when --, therefor.

Column 9, Line 8; In Claim 5, after "section" insert -- is mounted on the --.

Column 10, Line 17 (Approx.); In Claim 8, delete "sections" and insert -- section --, therefor.

Signed and Sealed this

Fifth Day of August, 2008

JON W. DUDAS
*Director of the United States Patent and Trademark Office*